US012401511B2

(12) United States Patent
Moy et al.

(10) Patent No.: US 12,401,511 B2
(45) Date of Patent: Aug. 26, 2025

(54) SYSTEMS AND METHODS FOR ISSUANCE AND MANAGEMENT OF NON-FUNGIBLE TOKENS

(71) Applicant: JPMORGAN CHASE BANK, N.A., New York, NY (US)

(72) Inventors: Christine Moy, New York, NY (US); Tyrone D Lobban, Loughton (GB); Keerthi Moudgal, Brooklyn, NY (US); Alexandra Prager Miller, Brooklyn, NY (US); George Kassis, London (GB); Stuart Hunter, New York, NY (US); Angelo Aratan, Brooklyn, NY (US); Sophia Wasserman, Manhattan, NY (US); Ganesh Anantwar, Mumbai (IN); Aditya Mayur Taday, Hoboken, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 259 days.

(21) Appl. No.: 18/065,285

(22) Filed: Dec. 13, 2022

(65) Prior Publication Data

US 2023/0188349 A1 Jun. 15, 2023

Related U.S. Application Data

(60) Provisional application No. 63/265,316, filed on Dec. 13, 2021.

(51) Int. Cl.
*H04L 9/32* (2006.01)
*G06Q 20/36* (2012.01)
(Continued)

(52) U.S. Cl.
CPC .......... *H04L 9/3213* (2013.01); *G06Q 20/36* (2013.01); *G06Q 20/389* (2013.01);
(Continued)

(58) Field of Classification Search
CPC .... G06Q 20/389; G06Q 20/405; G06Q 20/02; G06F 16/1805
See application file for complete search history.

(56) References Cited

U.S. PATENT DOCUMENTS 11,379,429 B1 * 7/2022 Lupowitz ............ G06F 16/1805
11,615,375 B2 * 3/2023 Giannini .............. G06Q 20/389
705/28

(Continued)

*Primary Examiner* — Barbara B Anyan
(74) *Attorney, Agent, or Firm* — GREENBERG TRAURIG LLP

(57) ABSTRACT

Systems and methods for issuance and management of non-fungible tokens are disclosed. In one embodiment, a method for issuing non-fungible tokens may include: (1) receiving, by a computer program executed by a non-fungible token as a service (NFTaaS) computer program and from a NFTaaS user interface, a minting request to mint a non-fungible token (NFT), wherein the minting request comprises content for the NFT and a plurality of NFT attributes; (2) identifying, by the NFTaaS computer program, a deployed smart contract for the plurality of NFT attributes; (3) minting, by the NFTaaS computer program, the NFT according to the NFT attributes using the identified deployed smart contract; and (4) deploying, by the NFTaaS computer program, the NFT to a distributed ledger.

17 Claims, 3 Drawing Sheets

(51) Int. Cl.
    *G06Q 20/38* (2012.01)
    *G06Q 20/40* (2012.01)
    *H04L 67/10* (2022.01)
    *G06Q 20/02* (2012.01)

(52) U.S. Cl.
    CPC ........... *G06Q 20/405* (2013.01); *H04L 67/10* (2013.01); *G06Q 20/02* (2013.01); *G06Q 2220/00* (2013.01); *H04L 2209/60* (2013.01)

(56) References Cited

U.S. PATENT DOCUMENTS

| | | | |
|---|---|---|---|
| 2021/0158335 A1* | 5/2021 | Bollen | G06Q 20/02 |
| 2022/0058636 A1* | 2/2022 | Yantis | G06Q 20/405 |
| 2023/0088674 A1* | 3/2023 | Lee | G06Q 20/389 |
| | | | 705/75 |

* cited by examiner

SYSTEMS AND METHODS FOR ISSUANCE AND MANAGEMENT OF NON-FUNGIBLE TOKENS

RELATED APPLICATIONS

This application claims priority to, and the benefit of, U.S. Provisional Patent Application Ser. No. 63/265,316, filed Dec. 13, 2021, the disclosure of which is hereby incorporated, by reference, in its entirety.

BACKGROUND OF THE INVENTION

1. Field of the Invention

Embodiments generally relate to systems and methods for issuance and management of non-fungible tokens.

2. Description of the Related Art

Non-fungible tokens, or NFTs, are collections of data that may represent or constitute a digital or physical asset, such as photos, videos, audio, signatures, etc. NFTs are generally tracked using distributed ledger technology, such as blockchain-based technology, in order to provide the owner of the NFT with proof of ownership. NFTs can be traded, bought, gifted, and sold in digital marketplaces.

SUMMARY OF THE INVENTION

Systems and methods for issuance and management of non-fungible tokens are disclosed. In one embodiment, a method for issuing non-fungible tokens may include: (1) receiving, by a computer program executed by a non-fungible token as a service (NFTaaS) computer program and from a NFTaaS user interface, a minting request to mint a non-fungible token (NFT), wherein the minting request comprises content for the NFT and a plurality of NFT attributes; (2) identifying, by the NFTaaS computer program, a deployed smart contract for the plurality of NFT attributes; (3) minting, by the NFTaaS computer program, the NFT according to the NFT attributes using the identified deployed smart contract; and (4) deploying, by the NFTaaS computer program, the NFT to a distributed ledger.

In one embodiment, the content for the NFT may include graphical content.

In one embodiment, the plurality of NFT attributes may include a NFT standard, a destination distributed ledger for the NFT, NFT transferability, a user eligibility requirement, a NFT gas fee payment option, etc.

In one embodiment, the deployed smart contract may be a plurality of deployed smart contracts, and each deployed smart contract is configured to mint NFTs for a set of different NFT attributes.

In one embodiment, a plurality of deployed smart contracts may be identified, and each selected deployed smart contract may be configured to mint NFTs for one of the NFT attributes.

In one embodiment, the method may also include verifying, by the NFTaaS computer program, that a user is eligible for the NFT before deploying the NFT.

In one embodiment, the method may also include storing, by the NFTaaS computer program, the NFT content to distributed file storage or non-distributed file storage.

In one embodiment, the NFT may be deployed to a distributed ledger address associated with a NFT-enabled wallet for a NFT owner.

In one embodiment, the NFT content may also include a digital identifier that uniquely identifies an owner of the NFT.

In one embodiment, the method may also include enforcing, by the NFTaaS computer program, an entitlement requirement before minting the NFT.

According to another embodiment, a system may include a non-fungible token as a service (NFTaaS) platform executing a NFTaaS computer program and associated with a user interface; a plurality of distributed ledgers in communication with the NFTaaS platform; distributed file storage; non-distributed file storage; a plurality of deployed smart contracts; and a non-fungible token (NFT)-enabled wallet for a NFT owner. A NFT creator submits a minting request to mint a NFT to the user interface, wherein the minting request comprises content for the NFT and a plurality of NFT attributes; the user interface communicates the minting request to NFTaaS platform; the NFTaaS computer program identifies one of the plurality of deployed smart contracts for the plurality of NFT attributes; the NFTaaS computer program mints the NFT according to the NFT attributes using the identified deployed smart contract; the NFTaaS computer program deploys the NFT to one of the plurality of distributed ledgers, wherein the NFT is minted to a distributed ledger address associated with the NFT-enabled wallet; and the NFTaaS computer program writes the NFT content to the distributed file storage and/or the non-distributed file storage.

In one embodiment, the content for the NFT may include graphical content.

In one embodiment, the plurality of NFT attributes may include a NFT standard, a destination distributed ledger for the NFT, NFT transferability, a user eligibility requirement, a NFT gas fee payment option, etc.

In one embodiment, the deployed smart contract may be a plurality of deployed smart contracts, and each deployed smart contract is configured to mint NFTs for a set of different NFT attributes.

In one embodiment, a subset of the plurality of deployed smart contracts are identified, and each selected deployed smart contract may be configured to mint NFTs for one of the NFT attributes.

In one embodiment, the NFTaaS computer program verifies that the NFT owner is eligible for the NFT before deploying the NFT.

In one embodiment, the NFT content may also include a digital identifier that uniquely identifies an owner of the NFT.

According to another embodiment, a non-transitory computer readable storage medium, may include instructions stored thereon, which when read and executed by one or more computer processors, cause the one or more computer processors to perform steps comprising: receiving, from a non-fungible token as a service (NFTaaS) user interface, a minting request to mint a non-fungible token (NFT), wherein the minting request comprises content for the NFT and a plurality of NFT attributes; identifying a deployed smart contract for the plurality of NFT attributes; minting the NFT according to the NFT attributes using the identified deployed smart contract; verifying that a NFT owner is eligible for the NFT before deploying the NFT; deploying the NFT to a distributed ledger, wherein the NFT is minted to a distributed ledger address associated with a NFT-enabled wallet for the NFT owner; and storing the NFT content to a distributed file storage and/or a non-distributed file storage.

In one embodiment the plurality of NFT attributes may include a NFT standard, a destination distributed ledger for the NFT, NFT transferability, a user eligibility requirement, a NFT gas fee payment option, etc.

In one embodiment the deployed smart contract may be selected from a plurality of deployed smart contracts, and each deployed smart contract is configured to mint NFTs for a set of different NFT attributes.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
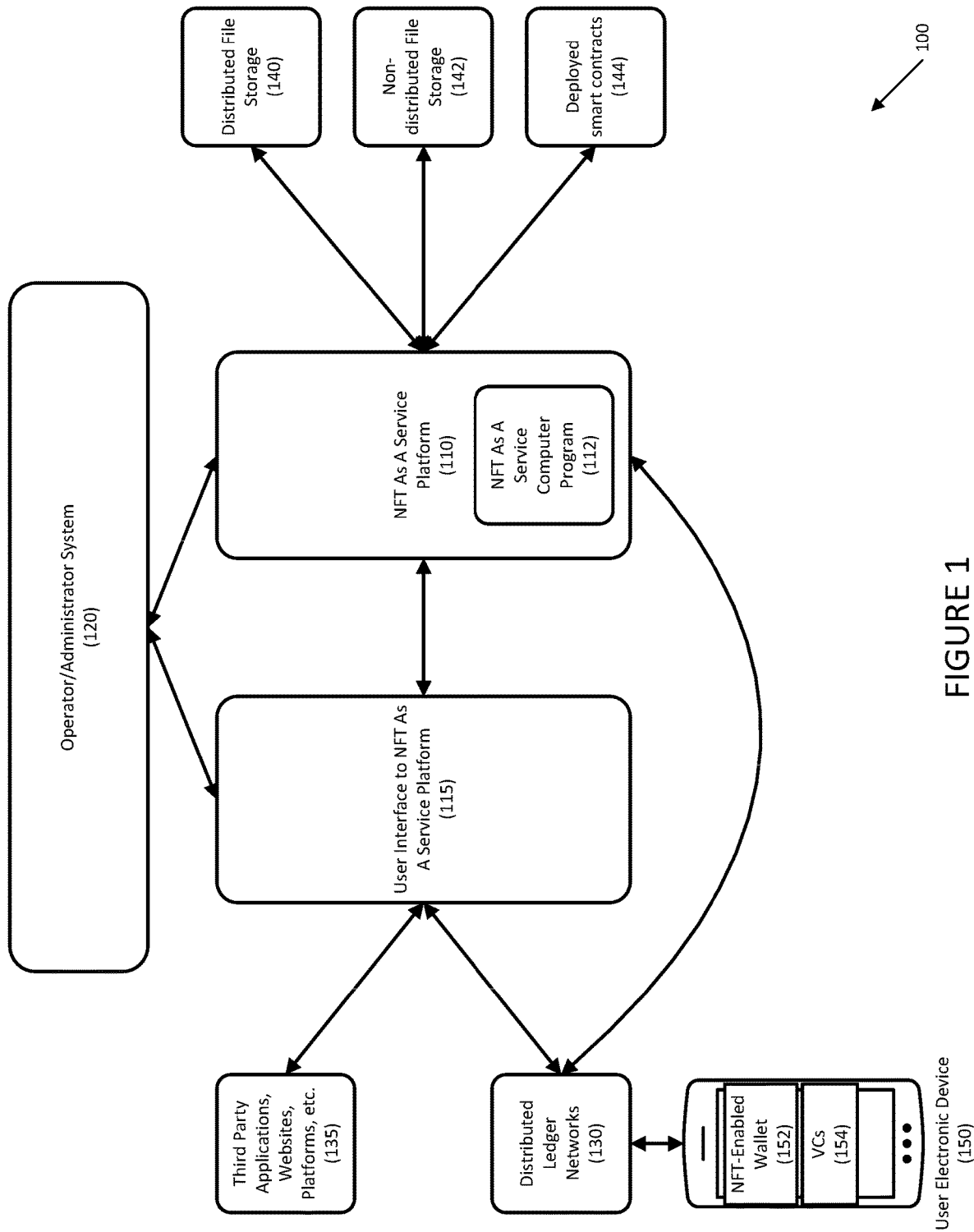
FIG. 1 depicts a system for issuance and management of non-fungible tokens according to an embodiment.

Embodiments are directed to systems and methods for issuance and management of non-fungible tokens.

In one embodiment, a NFT may be issued to an individual based on an experience, and data regarding the experience, such as the geolocation of the event, a timestamp for the event, etc. may be embedded within the NFT or may be separately associated with the NFT.

For example, an individual may attend a memorable event, such as a sporting event, a concert, a theater event, a corporate sponsored event, a milestone event (e.g., birthday, anniversary, wedding, retirement, etc.), etc. The event may be any sort of event that the attendees may wish to commemorate. For example, the NFT may be a souvenir NFT. At the event, an NFT issue station may be provided.

In one embodiment, the NFT issue station may be a stand-alone device, such as a kiosk, and may include an image capture device, a machine-readable code reader, a beacon, etc. The NFT issue station may display a static and/or dynamic machine-readable code, such as a QR code.

In another embodiment, the NFT issue station may be a physical poster, a display, etc. with a machine-readable code displayed. Any other suitable mechanism for issuing NFTs may be used as is necessary and/or desired.

The NFT issue station may generate and issue NFTs for the event with embedded event details. In one embodiment, the NFT issue station may also capture an image of the individual at the event. In another embodiment, the NFT may include the image and/or bonus content, such as a digital autograph, digital file, etc. that may be digitally signed by a third party, such as the celebrant, a celebrity, etc. In one embodiment, the bonus content may include an artistic rendering of the ticket used to attend the event.

In another embodiment, the NFT issue station may provide the machine-readable code that an individual may use to download the NFT.

In one embodiment, the bonus content may be represented in augmented reality data, such as artwork associated with the event that may be viewed through the user's electronic device.

In embodiments, restrictions may be provided on data in the NFT, including the bonus content. For example, restrictions may prevent sharing the data without permission from the issuer of the NFT. Other restrictions, similar to digital rights management, may only allow a degraded version of the data (e.g., degraded audio, images with watermarks, etc.) by anyone other than the owner of record of the NFT. In embodiments, before displaying or playing data in the NFT, an electronic device may validate ownership of the NFT on the distributed ledger. If the electronic device is associated with or registered to the owner of record, the electronic device may display or play an unaltered version of the data.

In one embodiment, the owner of the NFT may be identified by sharing a verifiable credential that proves that the individual is the owner of record, is authorized to have an unwatermarked version of the NFT, has the proper identification, has a certain account, is a fan of a certain artist or team, etc. The use of verifiable credentials in this manner may be used to enable a curated set of NFTs to be air-dropped/accessed by the recipient's NFT-enabled wallet. This uniquely utilized off chain data may be used to tailor the type of NFTs users receive. Examples of verifiable credentials are described in U.S. Provisional Patent Application Ser. No. 63/373,814, filed Aug. 29, 2022, U.S. Provisional Patent Application Ser. No. 63/265,316, filed Dec. 13, 2021, U.S. Provisional Patent Application Ser. No. 63/367,115, filed Jun. 27, 2022, and U.S. Provisional Patent Application Ser. No. 63/357,511, filed Jun. 30, 2022, the disclosures of which are hereby incorporated, by reference, in their entireties.

In one embodiment, the bonus content may be provided in the NFT, or it may be stored separately and may be pointed to by a pointer in the NFT.

In one embodiment, the NFT may include a hash of the bonus content.

In one embodiment, the individual may receive the NFT from the NFT issue station on the individual's electronic device. The souvenir may be transmitted from the NFT issue station to the individual's electronic device by any suitable manner (e.g., wirelessly, download from the cloud, etc.). The NFT may then be stored in the individual's electronic wallet, and the ownership of the NFT may be recorded on a distributed ledger.

In one embodiment, the individual's electronic device may be configured to construct and sign a distributed ledger transaction and submit the transaction to the distributed ledger network. This may trigger a smart contract function that may identify the NFT as owned by the individual and allow the NFT to be accessed through the individual's electronic wallet.

In another embodiment, the individual's electronic device may provide information to the NFT issuing stations that enables the NFT issuing station to submit a distributed ledger transaction and to update the distributed ledger to identify the individual as the owner of the NFT. This may result in the NFT being accessible to the individual via the individual's electronic wallet.

In one embodiment, an application executed on the individual's electronic device may display a graphical representation of the NFT using, for example, augmented reality (AR), and the individual may physically navigate the electronic device to the graphical representation of the NFT to "catch" it and store it in the individual's electronic wallet.

In one embodiment, AR may be used to allow the individual to graphically/visually seek out a mechanism by which updates to the ledger may be generated and submitted.

In one embodiment, the NFT issue station may include an optical reader that may receive a machine-readable code, such as a Quick Response (QR) code, that may represent an invitation to the event before generating and issuing the NFT.

In one embodiment, the NFT issue station may include a beacon that may communicate location information for the NFT issue station to electronic devices in the area. The individual's electronic device may indicate proximity to the NFT issue station and guide the individual to the NFT issue station.

In one embodiment, the NFT may include a digital identity, or DID, of the issuer and/or the individual, a verifiable credential, and/or evidence of a verifiable credential, valid at the time of issuance. Examples of digital identities and attestations are described in U.S. patent application Ser. No. 16/878,457, filed May 19, 2020, and U.S. Provisional Patent Application Ser. No. 62/850,181, filed May 20, 2019, U.S. Provisional Patent Application Ser. No. 62/976,262 filed Feb. 13, 2020, U.S. Provisional Patent Application Ser. No. 63/126,335 filed Dec. 16, 2020, and U.S. patent application Ser. No. 17/174,650 filed Feb. 12, 2021, the disclosures of which are hereby incorporated, by reference, in their entireties.

In embodiments, the NFT may include identity information for relevant third parties. For example, an NFT issuer may issue an NFT for media (e.g., a game), and the metadata may include digital signatures, DIDs, verifiable credentials, etc. of each participant.

In one embodiment, the NFT may be associated with a chain of trust, supported by digital identities and attestations. Examples of chains of trust are disclosed in U.S. patent application Ser. No. 17/174,650 and U.S. Provisional Patent Application Ser. No. 62/976,262, the disclosures of which are hereby incorporated, by reference, in their entireties. In embodiments, restriction of the NFT may be restricted without confirmation of the chain of trust.

In another embodiment, an infrastructure may be provided for wrapping public NFTs for permissioned blockchains. In one embodiment, NFTs may be written to a public distributed ledger, such as a public blockchain. A shadow version of the NFT may be written to a private distributed ledger. For example, the NFT that is written to the public distributed ledger may be wrapped with data, such as experience data associated with receiving the NFT, and then written to the private distributed ledger. In embodiments, individuals other than the owner of the NFT may access the NFT contents on the public distributed ledger.

In another embodiment, an infrastructure may be provided for issuing NFTs for permissioned blockchains. The NFTs may be written to a permissioned distributed ledger and later be ported or wrapped into public blockchains.

In embodiments, each transfer of a NFT may be recorded on a distributed ledger. A smart contract or similar may track the transfers and report the transfers to the issuer of the NFT. The owner of the NFT may receive income based on each transfer. In addition, each transfer of an NFT may be a taxable event, and the transfers may be used to assess tax liabilities.

In one embodiment, individuals may share an image or graphical/digital representation represented or constituted by their NFTs, such as jpegs, gifs, etc., with others using, for example, social media. For example, after receiving a NFT, an individual may post such to a social media account. Others may then comment on the NFT, providing comments, "likes," and other feedback.

In embodiments, a separate NFT social network may be provided for sharing NFTs and viewing/commenting on the NFTs owned by others. Each individual in the NFT social network may have a separate NFT social network address by which others may contact the individual.

In embodiments, owned NFTs may be used to provide access to certain events. For example, an owned NFT may provide VIP access to an event, may be presented to receive offers or discounts that are not available without the NFT, may be used to receive additional NFTs, digital content, etc. In embodiments, owned NFTs may provide access to events in both the real world and in virtual shared spaces, such as "metaverses."

In one embodiment, owned NFTs may provide access to exclusive real-world experiences, such as meeting celebrities, earning loyalty points through regular-way loyalty programs, etc.

In one embodiment, in the metaverse, the owned NFTs may provide access to virtual events or access to virtual functionalities. For example, a user may claim a NFT from attending a live or a virtual basketball game and may then use the NFT in the virtual world, such as in a virtual basketball game, to access or unlock certain features such as powers, basketball courts or stadiums, uniforms, etc. that may be otherwise inaccessible, etc.

Referring to FIG. 1, a system for issuance and management of non-fungible tokens is disclosed according to an embodiment. System 100 may include NFT as a service platform 110, user interface to NFT as a service platform 115, operator/administrator system 120, distributed ledger network(s) 130, third-party applications, websites, platforms, etc. 135, distributed file storage 140, non-distributed file storage 142, and deployed smart contracts 144. Connectivity to distributed ledger network(s) 130, third-party applications, websites, platforms, etc. 135, distributed file storage 140, non-distributed file storage 142, and deployed smart contracts 144 may be provided by one or more Application Programming Instances (APIs).

NFT as a service platform 110 may execute NFT as a service computer program 112 that may manage the creation of NFTs.

Distributed file storage 140 and/or non-distributed file storage 142 may store content to be included in, or linked to, one or more NFT.

In one embodiment, deployed smart contracts 144 may include a set of instructions (e.g., code) that is accessible at a specific address on the network to which the deployed smart contracts 144 are deployed. When a set of given criteria are met which are outlined in the deployed smart contract 144, then the instructions are able to be executed.

In one embodiment, one deployed smart contract 144 may be provided for each set of possible NFT attributes selected by the NFT creator, operator, or administrator. For example, one deployed smart contract may be provided for minting NFTs that are transferrable on a particular distributed ledger. Another smart contract may be provided for minting NFTs that are non-transferrable on a particular distributed ledger. Another smart contract may be provided for minting NFTs that are transferrable on a different distributed ledger, etc.

In another embodiment, one deployed smart contract 144 may be provided for each minting attribute, and the deployed smart contract 144 may be executed separately.

NFT as a service platform 110 and/or user interface 115 may include modules, such as a module to select a token standard for a NFT, a module to select the distributed ledger network for the NFTs, a system to select NFT attributes and mint the NFTs, a module to interact with distributed ledger networks 130, a module to interact with third party applications, websites, platforms 135, a module to interact with NFT-enabled wallet 152, a module to interact with distributed file storage network 140, a module to interact with non-distributed file storage network 142, and a module to interact with deployed smart contracts 144. In one embodiment, user interface 115 may provide a frontend in which NFT attributes may be selected, and those selections may be provided to NFT as a service computer program 112.

User interface 115 may provide an interface for distributed ledger networks 130 and/or third-party applications, websites, platforms, etc. 135 to interface with NFT as a service platform 110. Connectivity may be provided between user interface 115 and distributed ledger systems 130 and/or third-party applications, websites, platforms, etc. 135 by one or more application programming interfaces (API).

Distributed ledger networks 130 may include any distributed ledger network that may support NFTs.

Third-party applications, websites, platforms, etc. 135 may include any application, website, or platform that may support NFTs.

In one embodiment, a NFT creator, operator, administrator, third party applications, websites, platforms 135, may submit a NFT minting request to NFT as a service platform 110 via user interface 115. User interface 115 may provide a plurality of NFT attributes, such as whether the NFT is transferrable or non-transferrable, whether the recipient is required to have a verifiable credential to receive the NFT, the token standard for the NFT, the distributed ledger network for the NFT, etc.

Operator/Administrator 120 may include a module to manage users, entitlements, and roles, a module to manage NFT as a service platform 110, a module to manage smart contracts, a module to manage third party connectivity, a module to authenticate and validate users, and a module to orchestrate NFT minting.

In one embodiment, entitlements to mint NFTs or to access deployed smart contracts 144 may be enforced by operator/administrator system 120, user interface 115, or by NFT as a service platform 110.

In one embodiment, operator/administrator system 120 may create, update, and/or deploy smart contracts 144 as is necessary and/or desired. Entitlements may be enforced at the operator/administrator system 120 level and deployed smart contract 144 level.

In one embodiment, NFTs may be minted to an address on one of distributed ledger networks 130 that may be associated with NFT-enabled wallet 152 for the NFT owner. NFT-enabled wallet 152 may be executed by user electronic device 150. In another embodiment, NFT-enabled wallet 152 may be stored on distributed ledger network 130 and may be accessed using a wallet application (not shown) on user electronic device 150.

NFT-enabled wallet 152 may retrieve information regarding NFTs owned by the owner of NFT-enabled wallet 152, and may render the contents of the NFTs.

User electronic device 150 may further store or provide access to one or more verifiable credentials (VCs) 154 for the user.

Figure 2:
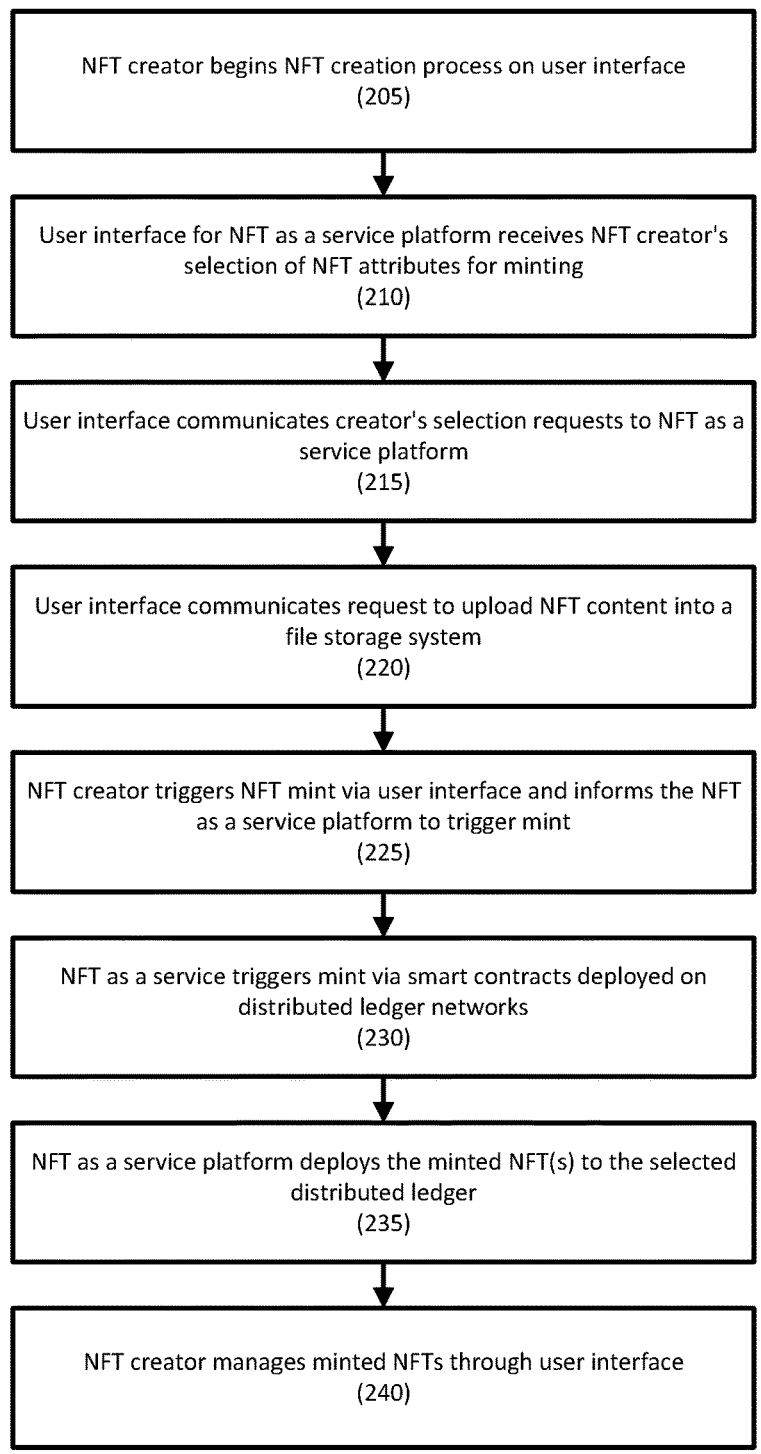
FIG. 2 depicts a method for issuance of non-fungible tokens according to one embodiment.

Referring to FIG. 2, a method for issuance of non-fungible tokens is disclosed according to an embodiment.

In step 205, a NFT creator may begin a creation process for one or more NFT using, for example, a user interface such as a NFT as a service user interface. This may include, for example, creating or establishing content for the NFT, such as data, graphics (e.g., jpegs), etc.

In one embodiment, the NFT creator may be an individual, an application or computer program, etc.

In one embodiment, the user interface may be provided on a user electronic device on a browser, by an application, etc.

In step 210, the user interface may receive the NFT creator's selection of NFT attributes for minting the NFT. For example, the NFT creator may select different attributes, such as selecting or entering whether the NFT is transferable, redeemable, the distributed ledger network, the NFT service, a number of NFTs, a NFT name or collection name, NFT terms and conditions, metadata, NFT gas fee payment options (e.g., paid by the NFT creator, a third party using a meta transaction protocol that allow for a third-party to send transactions and pay the gas fees attributed to them on behalf of another user, etc.), any verifiable credentials required to receive the NFT, etc. Any additional or different suitable NFT attributes may be provided as is necessary and/or desired.

In one embodiment, the NFT creator may select the NFT attributes using a graphical user interface.

In step 215, the user interface may communicate the NFT creator's selections to a NFT as a service platform. The user interface may communicate the selections by, for example, an API exposed by the NFT as a service platform.

In step 220, the user interface may communicate a request to upload NFT content (e.g., jpeg, gif, other file) into a file storage system, such as a distributed file system, a non-distributed file system, etc.

In step 225, the NFT creator may initiate the mint via the user interface, which may inform the NFT as a service platform to initiate the mint.

In step 230, the NFT as a service platform may trigger the mint via smart contracts deployed on distributed ledger networks. For example, the NFT as a service platform may use a minting module to identify the appropriate deployed smart contracts to mint the NFT(s) according to the NFT attributes. In one embodiment, a deployed smart contract may be provided for each set of NFT attributes that may be selected; in another embodiment, deployed smart contracts may be provided for each NFT minting attribute and the deployed smart contracts may be executed separately; in another embodiment, a deployed smart contract may be provided that contains a plurality of available NFT attributes that may be selected for a particular distributed network.

In one embodiment, the NFT as a service platform may enforce entitlements to mint NFTs, to access certain deployed smart contracts, etc. For example, the NFT as a service platform may verify that the NFT creator is entitled to mint NFTs in accordance with the NFT attributes, or to use the deployed smart contracts.

In step 235, the NFT as a service platform may deploy the minted NFT(s) to the selected distributed ledger and the NFT recipient's NFT-enabled wallet.

In one embodiment, before the NFT is deployed to the NFT recipient's NFT-enabled wallet, the NFT may verify that the recipient has the requisite verifiable credentials or other digital identifier.

In step 240, the NFT creator or an administrator may manage minted NFTs through the user interface. For example, the NFT creator may trigger "NFT drops," NFT transfers, orchestrate the NFT creator's strategy, campaign and/or other objectives for the NFT, etc.

Figure 3:
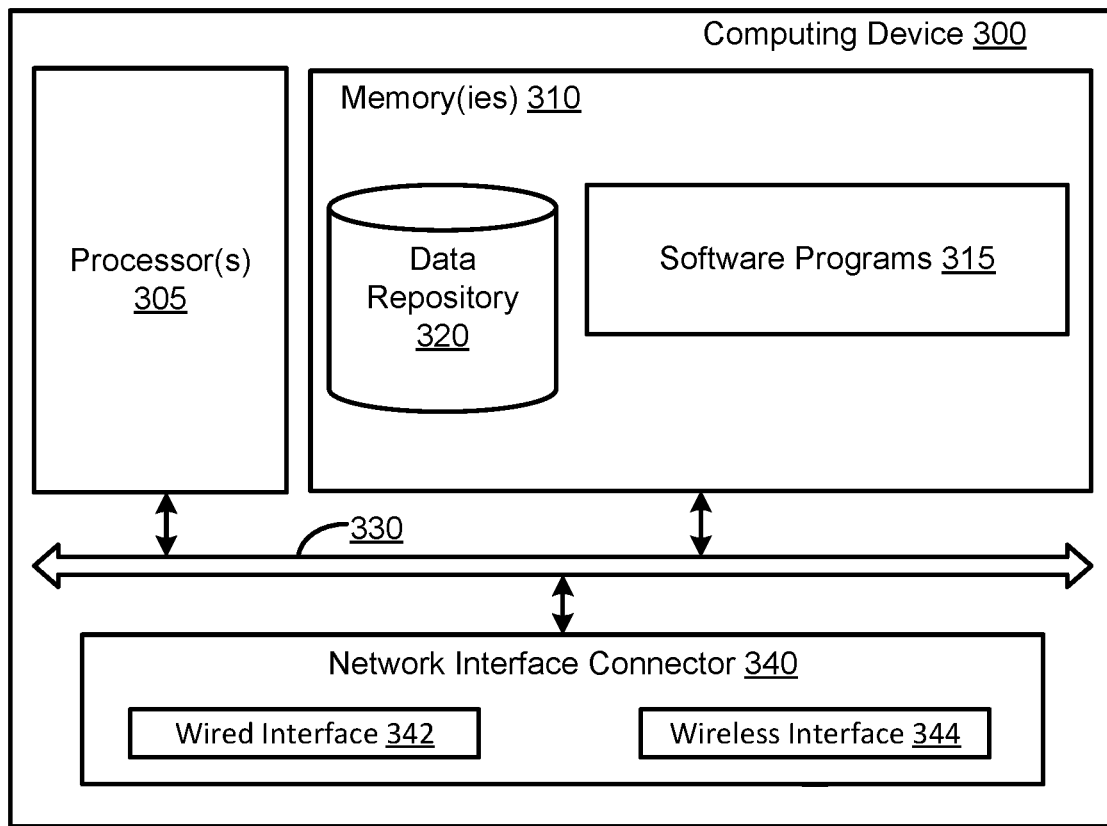
FIG. 3 depicts an exemplary computing system for implementing aspects of the present disclosure.

Referring to FIG. 3, depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for issuing non-fungible tokens; comprising:
receiving, by a computer program executed by one or more processors, the computer program comprising a non-fungible token as a service (NFTaaS) computer program, and from a NFTaaS user interface, a minting request to mint a non-fungible token (NFT), wherein the minting request comprises content for the NFT and a plurality of NFT attributes, wherein the NFT content comprises graphical content;
identifying, by the NFTaaS computer program, a deployed smart contract for the plurality of NFT attributes;
minting, by the NFTaaS computer program, the NFT according to the NFT attributes using the identified deployed smart contract;
deploying, by the NFTaaS computer program, the NFT to a distributed ledger; and
storing, by the NFTaaS computer program, the NFT content to distributed file storage and the NFT content to non-distributed file storage, the graphical content of the NFT content being linked to the NFT.

2. The method of claim 1, wherein the plurality of NFT attributes are selected from the group consisting of: a NFT standard, a destination distributed ledger for the NFT, NFT transferability, a user eligibility requirement, and a NFT gas fee payment option.

3. The method of claim 1, wherein the deployed smart contract is selected from a plurality of deployed smart contracts, and each deployed smart contract is configured to mint NFTs for a set of different NFT attributes.

4. The method of claim 1, wherein a plurality of deployed smart contracts are identified, and each selected deployed smart contract is configured to mint NFTs for one of the NFT attributes.

5. The method of claim 1, further comprising:
verifying, by the NFTaaS computer program, that a user is eligible for the NFT before deploying the NFT.

6. The method of claim 1, wherein the NFT is deployed to a distributed ledger address associated with a NFT-enabled wallet for a NFT owner.

7. The method of claim 1, wherein the NFT content further comprises a digital identifier that uniquely identifies an owner of the NFT.

8. The method of claim 1, further comprising:
enforcing, by the NFTaaS computer program, an entitlement requirement before minting the NFT.

9. A system, comprising:
a non-fungible token as a service (NFTaaS) platform comprising a NFTaaS computer program and associated with a user interface;
one or more processors executing the NFTaaS platform;
a plurality of distributed ledgers in communication with the NFTaaS platform;
distributed file storage;
non-distributed file storage;
a plurality of deployed smart contracts; and
a non-fungible token (NFT)-enabled wallet for a NFT owner;
wherein:
    a NFT creator submits a minting request to mint a NFT to the user interface, wherein the minting request comprises content for the NFT and a plurality of NFT attributes, wherein the NFT content comprises graphical content;
    the user interface communicates the minting request to NFTaaS platform;
    the NFTaaS computer program identifies one of the plurality of deployed smart contracts for the plurality of NFT attributes;
    the NFTaaS computer program mints the NFT according to the NFT attributes using the identified deployed smart contract;
    the NFTaaS computer program deploys the NFT to one of the plurality of distributed ledgers, wherein the NFT is minted to a distributed ledger address associated with the NFT-enabled wallet; and
    the NFTaaS computer program writes the graphical content of the NFT content to the distributed file storage and the non-distributed file storage.

10. The system of claim 9, wherein the plurality of NFT attributes are selected from the group consisting of: a NFT standard, a destination distributed ledger for the NFT, NFT transferability, a user eligibility requirement, and a NFT gas fee payment option.

11. The system of claim 9, wherein the deployed smart contract is selected from a plurality of deployed smart contract, and each deployed smart contract is configured to mint NFTs for a set of different NFT attributes.

12. The system of claim 9, wherein a subset of the plurality of deployed smart contracts are identified, and each selected deployed smart contract is configured to mint NFTs for one of the NFT attributes.

13. The system of claim 9, wherein the NFTaaS computer program verifies that the NFT owner is eligible for the NFT before deploying the NFT.

14. The system of claim 9, wherein the NFT content further comprises a digital identifier that uniquely identifies an owner of the NFT.

15. A non-transitory computer readable storage medium, including instructions stored thereon, which when read and executed by one or more computer processors, cause the one or more computer processors to perform steps comprising:
    receiving, from a non-fungible token as a service (NFTaaS) user interface, a minting request to mint a non-fungible token (NFT), wherein the minting request comprises content for the NFT and a plurality of NFT attributes, wherein the NFT content comprises graphical content;
    identifying a deployed smart contract for the plurality of NFT attributes;
    minting the NFT according to the NFT attributes using the identified deployed smart contract;
    verifying that a NFT owner is eligible for the NFT before deploying the NFT;
    deploying the NFT to a distributed ledger, wherein the NFT is minted to a distributed ledger address associated with a NFT-enabled wallet for the NFT owner; and
    storing the graphical content of the NFT content to a distributed file storage and a non-distributed file storage.

16. The non-transitory computer readable storage medium of claim 15, wherein the plurality of NFT attributes are selected from the group consisting of: a NFT standard, a destination distributed ledger for the NFT, NFT transferability, a user eligibility requirement, and a NFT gas fee payment option.

17. The non-transitory computer readable storage medium of claim 15, wherein the deployed smart contract is selected from a plurality of deployed smart contract, and each deployed smart contract is configured to mint NFTs for a set of different NFT attributes.

* * * * *